May 1, 1951 J. A. HADDAD ET AL 2,551,119

ELECTRONIC COMMUTATOR

Filed July 9, 1948 4 Sheets-Sheet 1

Inventors
JERRIER A. HADDAD
RALPH L. PALMER

Dwight D. Mooney
Agent

May 1, 1951 J. A. HADDAD ET AL 2,551,119

ELECTRONIC COMMUTATOR

Filed July 9, 1948 4 Sheets-Sheet 2

Inventors
JERRIER A. HADDAD
RALPH L. PALMER

Dwight D. Mooney
Agent

Inventors
JERRIER A. HADDAD
RALPH L. PALMER
Dwight D. Mooney
Agent

May 1, 1951 J. A. HADDAD ET AL 2,551,119

ELECTRONIC COMMUTATOR

Filed July 9, 1948 4 Sheets-Sheet 4

| | TRIGGER CIRCUITS | | | |
|---|---|---|---|---|
| | A | B | C | D |
| 0 | ON | OFF | OFF | OFF |
| 1 | OFF | ON | OFF | OFF |
| 2 | OFF | OFF | ON | OFF |
| 3 | OFF | OFF | OFF | ON |
| 4 | ON | OFF | OFF | OFF |

Inventors
JERRIER A. HADDAD
RALPH L. PALMER

Dwight D. Mooney
Agent

Patented May 1, 1951 2,551,119

UNITED STATES PATENT OFFICE 2,551,119

ELECTRONIC COMMUTATOR

Jerrier A. Haddad, Fishkill, and Ralph L. Palmer, Poughkeepsie, N. Y., assignors to International Business Machines Corporation, New York, N. Y., a corporation of New York Application July 9, 1948, Serial No. 37,828

14 Claims. (Cl. 250—27)

This invention relates to commutators and more particularly to electronic commutators using a series of trigger circuits interconnected by coupling circuits and is of the type disclosed and referred to in the copending application of Palmer et al. Serial No. 38,078, filed July 9, 1948.

Briefly, a coupling circuit is used to connect each trigger to the next higher one. The pulses to be counted are applied simultaneously to all the coupling circuits, only one of which is responsive thereto at any one time. When a pulse to be counted is applied to a responsive coupling circuit, it transfers a voltage to the next higher trigger to initiate a switching of the trigger from one stable condition to the other. When the next higher trigger switches, it transfers a voltage to the next lower trigger to switch it back to the stable condition it was in, prior to being switched in response to a voltage transferred from its next lower coupling circuit. At the same time the next higher trigger transfers a voltage to the next higher coupling circuit to render it responsive to the operating pulses. In this manner the step-by-step switching of the trigger continues until all triggers are in their initial stable condition or until the cycle of commutator operation is complete. Thereafter, the same cyclic pattern can be repeated in response to the pulses.

It is an object of the invention to provide a novel ring type commutator having a series of triggers each connected to the next higher one through a coupling circuit and to the next lower one through a capacitive coupling.

It is another object to provide a ring type commutator wherein a switching of each trigger causes a switching of the next lower trigger and renders the next higher coupling circuit responsive to the pulses applied to the commutator.

It is another object to provide a circuit for producing peaked pulses from square waves and means for transferring the peaked pulses simultaneously to all coupling circuits, only one of which is responsive to the peaked pulses at any given time.

It is a further object to provide a commutator responsive to a predetermined number of pulses and non-responsive thereafter, until manually reset to its original starting position.

It is a further object to provide a commutator which is non-responsive to the pulses applied to it until receipt of a pulse to render it responsive.

It is a still further object to provide a commutator non-responsive to the pulses to be counted until receipt of a pulse to render it responsive and wherein the last pulse commutated by each cycle of commutator operation is utilized to effect a switching of the same trigger switched by the previous pulse to automatically reset the commutator.

It is a still further object to provide a novel switching circuit responsive to pulses applied to it for switching the stable condition of a trigger, wherein the switching of that trigger renders the switching circuit responsive to the pulses.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1 and 1*a* taken together comprise a circuit diagram showing one embodiment of the novel ring type commutator of the invention.

Figure 1:
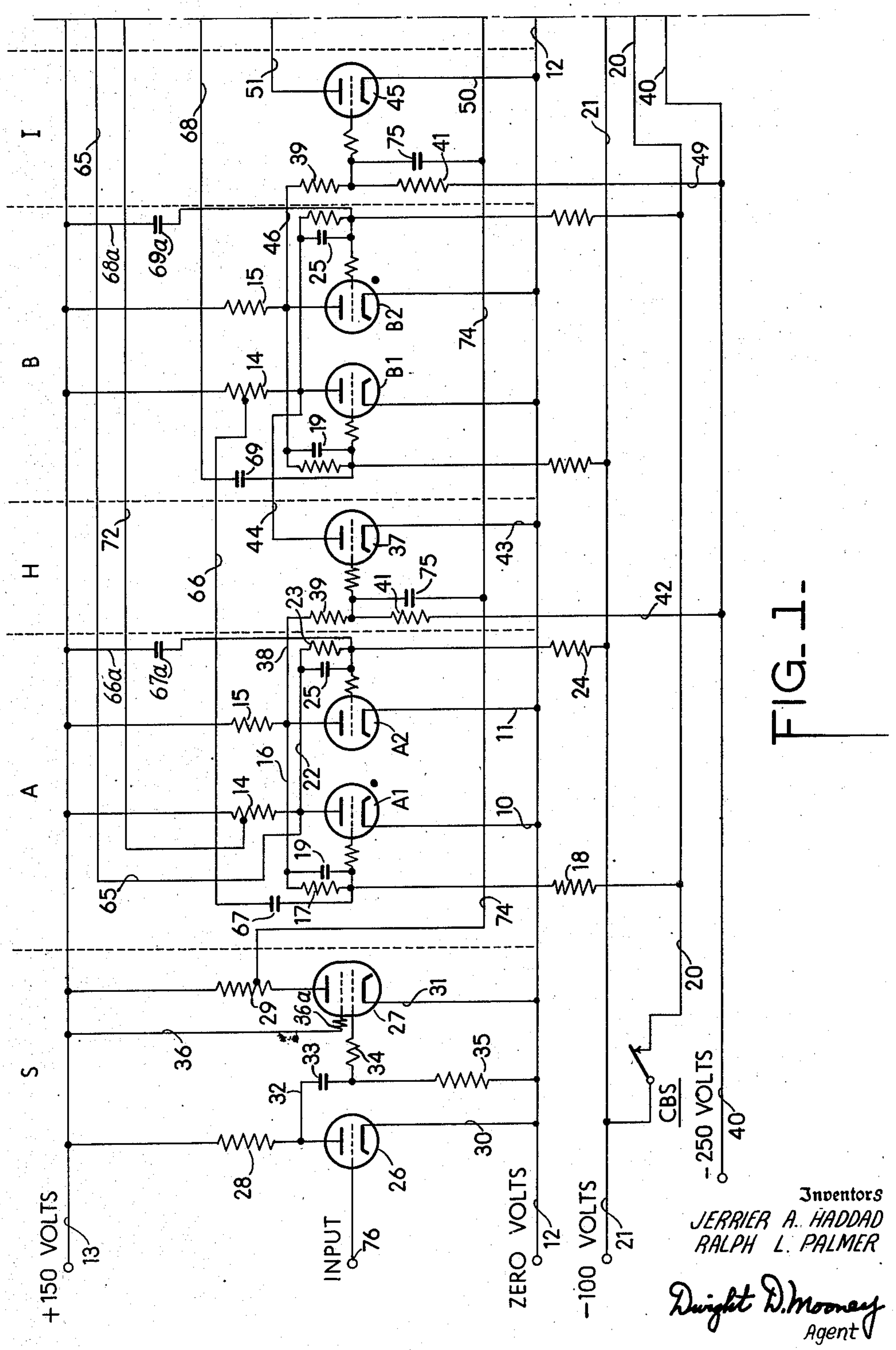
Figures 1A, 4:
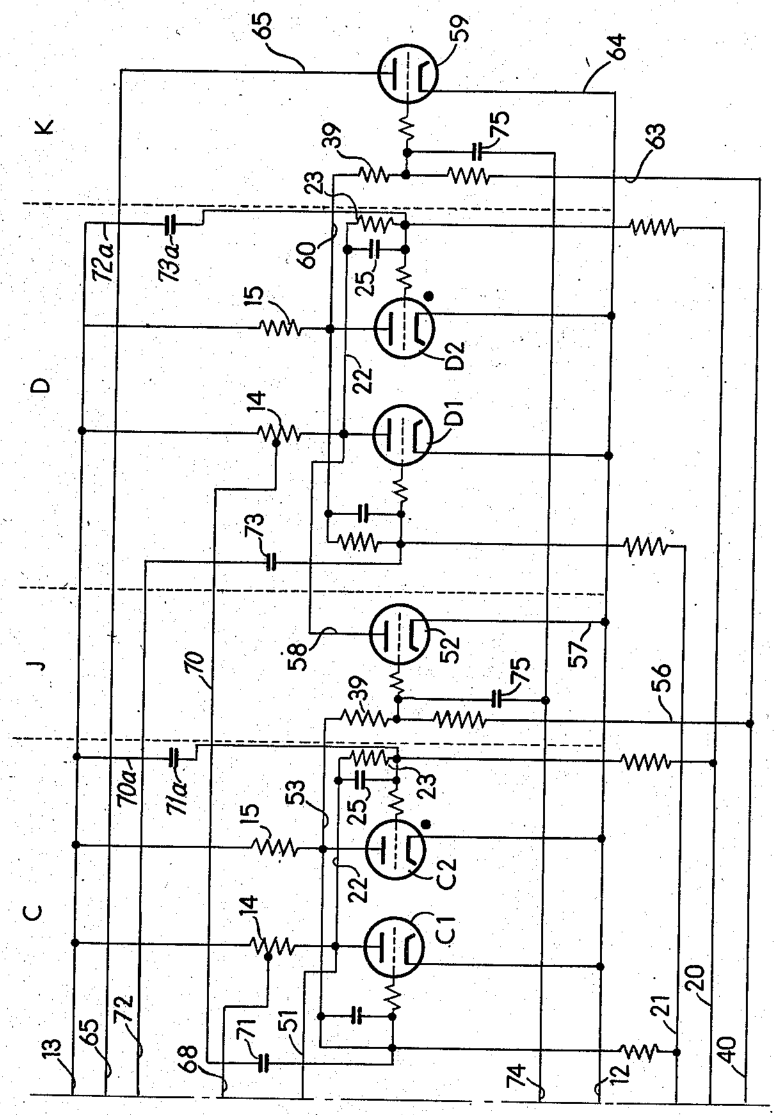
Fig. 4 is a chart illustrating one cycle of commutator operation for the embodiment shown in Figs. 1 and 1*a*.

Referring more particularly to Figs. 1 and 1*a*, the novel commutator comprises a pulse shaping circuit generally indicated by S, four trigger circuits, A, B, C, and D, and trigger coupling stages H, I, J, and K. The shaping circuit and each trigger and coupling stage are illustrated as divided by broken vertical lines for simplicity of illustration. Each trigger includes two grid controlled tubes designated A1 and A2, B1 and B2, C1 and C2, and D1 and D2, respectively. The tubes used are all of the same type and may, for example, be of the ordinary type having a single tube per envelope or, if desired, all tubes may be of the type having two tubes in a single envelope, such as, for example, the type designated as 6J6.

Each trigger circuit A to D has two stable conditions which are alternately assumed. In one stable condition, one tube is conductive and the other tube non-conductive, and in the other condition the conductive condition of the tubes is reversed. These two stable conditions are referred to herein as the On and Off conditions.

The On condition is arbitrarily assumed to be when the left hand tube A1, for example, of the trigger A is conductive and the right hand tube A2 is non-conductive. The Off condition is assumed as that when the left hand tube A1, for example, of the trigger A is non-conductive and the right hand tube A2 is conductive.

In the initial or zero starting position of the commutator, the trigger A is in the On condition and the triggers B, C and D are in the Off condition, as indicated by the dot to the lower left side of tube A1 and to the lower right side of the tubes B2, C2 and D2, respectively. This indicating scheme is followed on all of the drawings referred to herein. The circuits of the triggers A, B, C and D are identical and the operation of the triggers will be described with reference to trigger A and the values of resistances and capacitances employed therein. These values are given solely for the purpose of clarifying the explanation, and it is specifically understood that they may be varied considerably without departing from the principles of the invention.

The cathodes of the tubes A1 and A2 are connected through leads 10 and 11, respectively, to a zero volt line 12 and the plates of those tubes are connected to a +150 volt line 13 through resistors 14 and 15, respectively, each of which comprises two resistors, one of 12 k. ohms connected to the plate and the other in series therewith of 7.5 k. ohms connected to line 13. A lead 16 connects the plate of the tube A2 to the upper end of a voltage divider consisting of resistors 17 and 18 of 200 k. ohms each. A capacitor 19 of 100 micro-microfarads is connected in shunt with the resistor 17. The lower end of the divider is connected to a −100 volt cancel bias line 20 connected to a −100 volt bias line 21 through cancel bias switch CBS. Similarly, a lead 22 connects the plate of the tube A1 to the upper end of a voltage divider consisting of the resistors 23 and 24 of 200 k. ohms each. A capacitor 25 of 100 micro-microfarads shunts the resistor 23. The lower end of the voltage divider is connected to the −100 volt bias line 21.

Since the trigger A is On at the zero or starting position, the tube A2 is biased to cut off by the well known trigger action so that tube A1 conducts. The triggers B, C and D are Off in the starting position, the tubes B2, C2 and D2 being conductive and the tubes B1, C1 and D1 being non-conductive. The control grids of the tubes A1, B2, C2 and D2 are connected to the cancel bias line 20 to provide for quick resetting of the commutator to the chosen starting position.

To reset the circuit to the preselected starting position, the cancel bias line 20 is disconnected from the −100 volt bias line by opening the switch CBS. When the switch CBS is opened, the voltage applied to the tubes A1, B2, C2 and D2 rises above the cutoff value and these tubes are rendered conductive irrespective of their condition immediately prior to the time when the switch CBS was opened. A similar cancel bias system is provided for each embodiment of the invention, and in each case the purpose served is the same, the particular changes being in the connections from the control grids of the chosen tubes and the cancel bias line to determine different preselected starting conditions of the respective trigger circuits.

It is now clear that the tubes having their control grids connected to the cancel bias line 20 are conductive when the commutator is in the zero or preselected starting position. The closing of the switch CBS does not remove the positive bias placed on the control grid of the conducting tubes but permits them to remain conductive until the stable condition of each trigger is changed by an external means. For example, the control grid of the tube A1 is placed at a potential determined by the voltage divider comprising the resistors 15, 17 and 18 connected between the +150 volt line 13 and the cancel bias line 20, and this potential is greater than the voltage required to maintain the tube A1 conductive.

In a manner which will be more fully understood hereinafter, the trigger A is switched from On to Off by the application of a negative pulse to the control grid of the conducting tube, and is switched On by the application of a negative pulse to the plate of the non-conducting tube.

When a negative pulse is applied to the control grid of the conducting tube A1, the positive bias on that control grid is decreased and the tube A1 thereupon rendered less conductive. The plate voltage of the tube A1 then rises and this increased plate voltage is transferred from the plate of the tube A1 to the control grid of the tube A2 through the parallel connected resistor 23 and capacitor 25. As a result, the control grid of the tube A2 is made sufficiently positive to render the tube A2 conductive. Because of this conduction, the voltage at the plate of the tube A2 decreases. This decreased voltage is transferred to the control grid of the tube A1 through the parallel connected resistor 17 and capacitor 19 and renders the tube A1 still less conductive. This cumulative action is continued until the tube A1 is made non-conductive and the tube A2 reaches a state of steady conductivity. Hence, the negative pulse applied to the control grid of the tube A1 switches the trigger A, as a whole, from the On to the Off condition. The trigger remains in the Off condition until a negative pulse is applied to the plate of the non-conducting tube A1.

When such is done, its plate is pulled negative and the trigger is flipped On. The trigger remains in the On condition until a negative pulse is applied to the control grid of the tube A1.

The alternate application of negative pulses to the control grid and plate of the tubes A1 and A2 causes the trigger to repeat the cycle of operation described above.

The shaping circuit S includes the grid controlled tubes 26 and 27 having their plates connected to the +150 volt line 13 through the resistors 28 and 29, respectively. The cathodes of the tubes 26 and 27 are connected to the zero volt line 12 through leads 30 and 31, respectively. The plate of the tube 26 is connected through a lead 32, a capacitor 33 of 100 micro-microfarads and a resistor 34 of 100 k. ohms to the control grid of the tube 27. The junction of the capacitor 33 and the resistor 34 is connected through a resistor 35 of 10 k. ohms to the zero volt line 12. The screen grid of the tube 27 is connected to the +150 volt line 13 through a lead 36 and parasitic suppressor resistor 36*a* of 470 ohms.

The plate of the tube A2 is connected to the control grid of the tube 37 of the coupling stage H through a lead 38 and a resistor 39 of 330 k. ohms. The control grid is connected also to a −250 volt bias line 40 through a resistor 41 of 510 k. ohms and a lead 42. The cathode of the tube 37 is connected to the zero volt line 12 through a lead 43 and the plate is connected to the plate of the tube B1 through a lead 44.

The plate of the tube B2 is connected to the control grid of the tube 45 of the coupling stage I through a lead 46 and the resistor 39. The control grid is connected also to the −250 volt line 40 through the resistor 41 and a lead 49. The cathode of the tube 45 is connected to the zero volt line 12 through a lead 50 and the plate is connected to the plate of the tube C1 through a lead 51.

The plate of the tube C2 is connected to the control grid of the tube 52 of the coupling stage J through a lead 53 and the resistor 39. The control grid is connected also to the −250 volt line 40 through the resistor 41 and a lead 56. The cathode of the tube 52 is connected to the zero volt line 12 through a lead 57 and the plate is connected to the plate of the tube D1 through a lead 58.

The plate of the tube D2 is connected to the control grid of the tube 59 of the coupling stage K through a lead 60 and the resistor 39. The control grid is connected to the −250 volt line 40 through the resistor 41 and a lead 63. The cathode of the tube 59 is connected to the zero volt line 12 through a lead 64 and the plate is connected to the plate of the tube A1 through a lead 65.

A lead 66 and a capacitor 67 of 40 micro-microfarads, in series with a 1 k. ohm resistor connect the plate resistor 14 of the tube B1 to the control grid of the tube A1. A lead 66*a* and a capacitor 67*a* of 40 micro-microfarads in series with a 1 k. ohm resistor connect the control grid of the tube A2 to the +150 volt line 13. A lead 68 and a capacitor 69 of 40 micro-microfarads, in series with a 1 k. ohm resistor connect the plate resistor 14 of the tube C1 to the control grid of the tube B1. A lead 68*a* and a capacitor 69*a* of 40 micro-microfarads in series with a 1 k. ohm resistor connect the control grid of the tube B2 to the +150 volt line 13. A lead 70 and a capacitor 71 of 40 micro-microfarads, in series with a 1 k. ohm resistor connect the plate resistor 14 of the tube D1 to the control grid of the tube C1. A lead 70*a* and a capacitor 71*a* of 40 micro-microfarads in series with a 1 k. ohm resistor connect the control grid of the tube C2 to the +150 volt line 13. A lead 72 and a capacitor 73 of 40 micro-microfarads in series with a 1 k. ohm resistor connect the plate resistor 14 of the tube A1 to the control grid of the tube D1. A lead 72*a* and a capacitor 73*a* of 40 micro-microfarads in series with a 1 k. ohm resistor connect the control grid of the tube D2 to the +150 volt line 13. A lead 74 and capacitors 75 each of 25 micro-microfarads connect the plate resistor 29 of the tube 27 to the control grids of the tubes 37, 45, 52 and 59.

The novel ring type commutator of the invention is operated by the application of a train of plus square wave pulses to a terminal 76 connected to the control grid of the tube 26 of the shaping circuit S. As a result, the tube 26 is rendered conductive in response to each plus pulse applied and non-conductive during the time pulses are not applied.

When a plus pulse is applied to the terminal 76, the clipper amplifier tube 26 is rendered conductive and the plate voltage drops sharply from +150 volts to approximately +50 volts. Because of the differentiating action of the capacitor 33 and the resistor 35, sharply peaked positive and negative pulses appear at the junction of the capacitor 33 and the resistor 34. The resistor 34 and the flow of grid current in the power tube 27 prevent the positive pulses from affecting the voltage at the plate of that tube. Hence, the negative pulse from the plate of the tube 26 impresses a negative pulse on the control grid of the tube 27 and causes a corresponding reduction in the current flow through the tube 27 to thus produce a positive voltage pulse at its plate.

While the input pulses to the terminal 76 are referred to as square wave pulses it is understood that it is not essential to the invention that the pulses be square waves but may be irregular positive pulses and may be impressed on the terminal 76 at random.

The lead 74 is connected to the plate resistor 29 and transfers therefrom a positive pulse having a voltage amplitude of approximately 80 volts and ranging in value from +50 volts to +130 volts. This positive pulse is transferred from the lead 74 through the capacitors 75 to the control grids of all the tubes 37, 45, 52 and 59.

The resistors 15, 39 and 41 comprise a voltage divider between the +150 volt line 13 and the −250 volt line 40. When the tubes A2, B2, C2 and D2 are conductive, the voltage at the junction of the resistors 15 and 39 will be lower than when those tubes are non-conductive. When those tubes are conductive, the voltage divider action of the resistors 39 and 41 causes the voltage on the control grids of the corresponding tubes 37, 45, 52 and 59 to be approximately −85 volts. The positive pulse transferred at this time from the lead 74 is insufficient to render the tubes conductive. Hence, when each of the triggers is Off, the tube of the interstage coupling whose control grid is connected to the plate of the right hand tube of the Off trigger is not rendered conductive by a positive pulse from the lead 74.

When each of the triggers is On, the voltage at the plate of the right hand tube thereof is higher than when the trigger is Off. When in this condition, the voltage divider action of the resistors 15, 39 and 41 places a voltage of approximately −35 volts on the control grid of the interstage tube next following, e. g., when the trigger A is On, the control grid of the tube 37 has a bias of −35 volts impressed upon it. If a positive pulse is applied to the control grid of an interstage tube, when that grid is at −35 volts, the tube is rendered conductive and when its control grid becomes slightly positive, the flow of grid current prevents any further substantial increase in its voltage bias. Because of this grid current, the full amplitude of the pulse impressed on the control grid is not effective to cause a corresponding voltage change in the bias on that grid.

Now that the operation of the trigger circuits, the shaping circuit and the pulsing of the interstage tubes has been described, a complete cycle of operation of this novel ring type commutator will be explained with reference to Figs. 1, 1*a* and 4.

Before any pulses are applied between the terminal 76 and the line 12, the commutator is in the zero or preselected starting condition, the triggers A, B, C, and D being On, Off, Off and Off, respectively, as shown in Fig. 4. Thus the control grid of the tube 37 is biased to approximately −35 volts and the control grids of the tubes 45, 52 and 59 are biased to approximately −85 volts so that the tube 37 only can be rendered conductive in response to the first positive pulse from the line 74.

When the first plus pulse is applied to the input terminal 76, a positive pulse is transferred from the plate resistor 29 to the lead 74 as described in connection with the operation of the shaping circuit. This positive pulse is transferred from the lead 74 through the capacitor 75 to the control grid of the tube 37 and renders it conductive. This causes the voltage at the plate of the tube 37 to decrease, and this decreased voltage is transferred through the lead 44 to the plate of B1 and pulls this plate negative and the trigger B is switched On. With trigger B On and tube B1 conductive, the voltage at its plate is decreased. This decreased voltage is transferred through the lead 66, capacitor 67 and the 1 k. ohm resistor to the control grid of the conductive tube A1 to render the tube A1 less conductive and switch the trigger A Off. The increased plate voltage of the tube B2 when trigger B is On reduces the negative bias of the control grid of tube 45 to approximately −35 volts.

The increased positive voltage at the plate of the tube B2, as a result of its non-conduction, does not cause the bias of the tube 45 to be increased to −35 volts immediately because of the delay introduced by the capacitor 75 and resistor 39. When the control grid of the tube 45 is finally biased to −35 volts, the first pulse is no longer present on the lead 74. It is readily understood that the pulses applied to the lead 74 should be of sufficiently short duration to prevent the operation of any intestage tube other than the one having its control grid biased as above.

When the second pulse is applied to the terminal 76, the resulting positive pulse on the lead 74 is applied through the capacitor 75 to the control grid of the tube 45 and since its grid bias is now relatively plus, this plus voltage superimposed on the relatively plus bias is enough to render that tube conductive. The resulting decreased voltage at the plate of the tube 45 is transferred through the lead 51 to the plate of tube C1 to flip trigger C On. When the trigger C switches On, the increased voltage at the plate of the tube C2 biases the control grid of the tube 52 to approximately −35 volts, and a decreased voltage at the plate of the tube C1 results in the transfer of a decreased voltage over the lead 68 and capacitor 69 to the control grid of the tube B1 to switch the trigger B Off.

When the third pulse is applied to the terminal 76, the resulting positive pulse on the lead 74 is applied through the capacitor 75 to the control grid of the tube 52 and renders that tube conductive. The resulting decreased voltage at the plate of the tube 52 is transferred through the lead 58 to the plate of the tube D1 to switch the trigger D On. When the trigger D switches On, the increased voltage at the plate of the tube D2 biases the control grid of the tube 59 to approximately −35 volts, and a decreased voltage at the plate of the tube D1 results in the transfer of a decreased voltage over the lead 70 and capacitor 71 to the control grid of the tube C1 to switch the trigger C to the Off condition.

When the fourth pulse is applied to the terminal 76, the positive pulse on the lead 74 is applied through the capacitor 75 to the control grid of the tube 59 and renders that tube conductive. The decreased voltage at the plate of the tube 59 is transferred through the lead 65 to the plate of tube A1 to switch the trigger A On. When the trigger A switches On, the increased voltage at the plate of the tube A2 biases the control grid of the tube 37 to approximately −35 volts and the decreased voltage at the plate of the tube A1 results in the transfer of a decreased voltage from the resistor 14 through the lead 72, capacitor 73 and the 1 k. resistor to the control grid of the tube D1 to switch the trigger D Off. The tubes and triggers of the commutator are now in the same condition they were at the zero or starting position, and one cycle of commutator operation is complete.

It is clear that throughout the operational cycle of this novel commutator only one interstage tube is conditioned to be responsive, at any given time, to the positive pulse from the lead 74. When the conditioned interstage tube becomes responsive, it effects a switching of the next succeeding trigger circuit. The change in the plate voltage of one tube of this trigger causes the next interstage tube to be conditioned to be responsive to positive pulses on the line 74, and the change in the plate voltage of the other tube of the trigger effects a switching of the prior trigger circuit.

It should be noted that the connection from the control grid of the tube A1 to the plate of the tube B1 provides a connection from the +150 volt line 13 to the control grid of the tube A1. Hence, a disturbance on the line 13 may constitute sufficient unbalance of the trigger A to cause it to switch from one stable condition to the other. For this reason the capacitor 67*a* is provided to connect the control grid of the tube A2 to the +150 volt line 13 and thereby permit any disturbance on the line 13 to be transferred to the control grids of both the tubes A1 and A2. The capacitor 67*a*, therefore, prevents a switching of the trigger A from one stable condition to the other irrespective of the disturbance on the line 13. The capacitors 69*a*, 71*a* and 73*a* function similarly to the capacitor 67*a* and prevent a switching of the triggers B, C and D, respectively.

A complete cycle of operation of the novel electronic commutator of Figs. 1*a* and 1*b* is schematically shown in Fig. 4 which is deemed self-expanatory.

Figure 2:
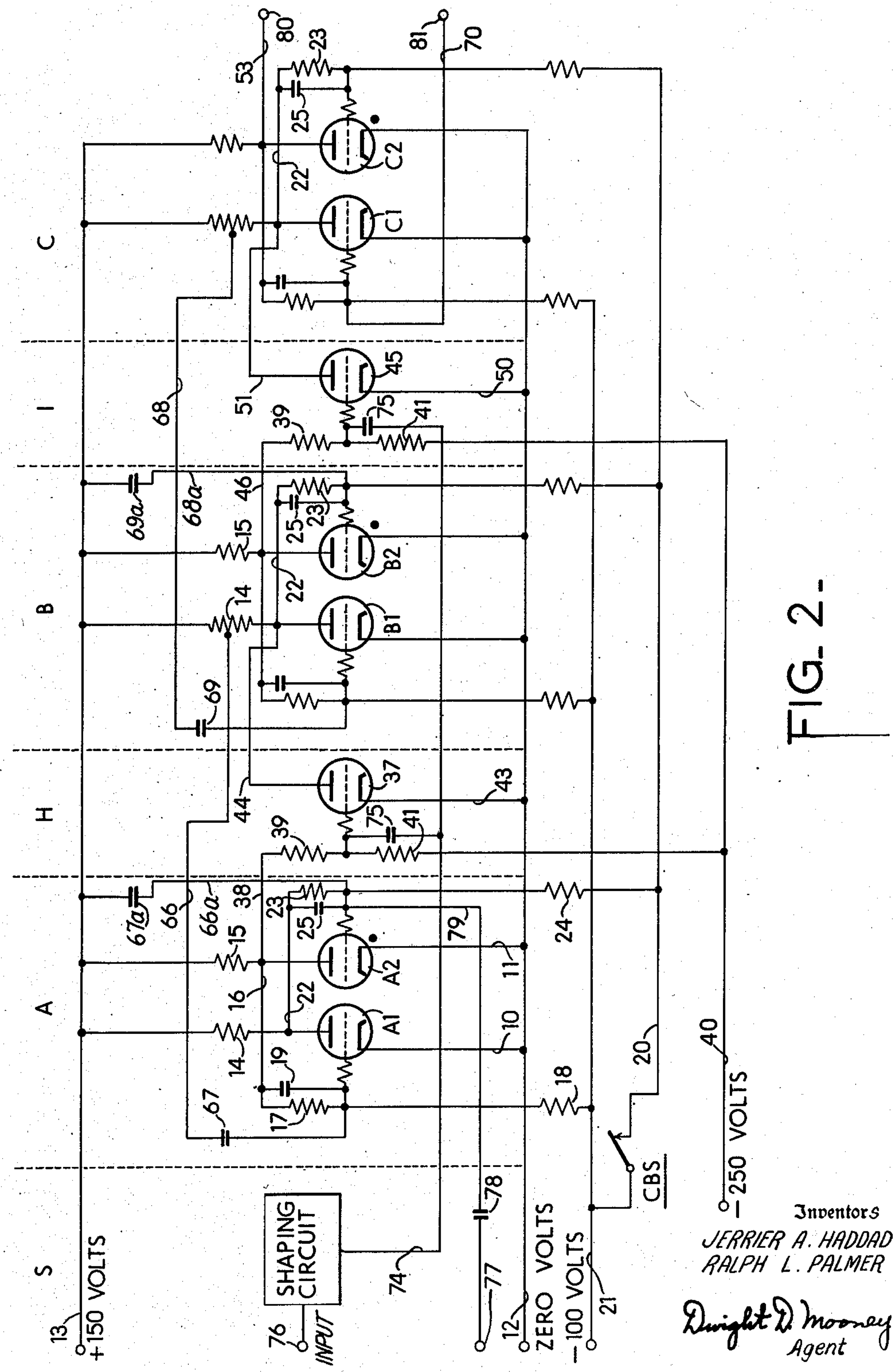
Fig. 2 is a circuit diagram showing one embodiment of a novel commutator for only one cycle of commutator operation at a preselected time.

Referring to Fig. 2, the novel commutator comprises a shaping circuit S shown in block diagram form and capable of producing a series of sharp positive pulses on the line 74 from the positive pulses applied to the input terminal 76, the trigger circuits A, B and C and the interstage coupling circuits H and I.

The individual triggers A, B and C and the interstage coupling circuits H and I are identical with those used in the novel commutator of Figs. 1 and 1*a*. Connections have been made to permit a different mode of operation. The control grid of the tube A1 is connected to the −100 volt line 21 through the resistor 18 and the control grid of the tube A2 is connected to the cancel bias line 20 through the resistor 24. Hence, at the zero or preselected starting position, the triggers A, B and C are each in the Off condition.

Terminal 77 is connected to the control grid of the tube A2 through a capacitor 78 and a lead 79. The plate of the tube C2 is connected through the lead 53 to the terminal 80 which exhibits the voltage changes at the plate of this tube C2. The terminal 80 can be connected to a subsequent interstage coupling circuit or other device responsive thereto. The control grid of the tube C1 is connected through the lead 70 to a terminal 81 to which positive pulses may be conductively applied to switch the trigger C from the On to the Off condition.

The same cancel bias switching arrangement is provided to reset the commutator to the zero or preselected starting condition as is used with the commutator of Figs. 1 and 1*a*.

If positive pulses are applied to the lead 74 from the shaping circuit S, when the counter is in the preselected starting condition, it has no effect on the stable condition of any of the triggers since the control grids of the tubes 37 and 45 are biased to approximately —85 volts.

When a negative pulse is applied to the terminal 77, it is transferred through the capacitor 78 and lead 79 to the control grid of the conductive tube A2 to render it less conductive and thereby initiate the switching of the trigger A from Off to On. From the description of the operation of the commutator of Figs. 1 and 1*a*, it is understood that this switching of the trigger A primes the commutator to be operable in response to subsequent plus pulses from the shaping circuit, in that the bias on the control grid of the tube 37 is made relatively plus (i. e. approximately —35 volts).

Now, when the next plus pulse from the shaping circuit is applied to the conditioned control grid of the tube 37, it is rendered conductive and transfers a negative pulse through the lead 44 to the plate of tube B1 to switch the trigger B On. When the trigger B switches On, the increased voltage at the plate of the non-conducting tube B2 causes the control grid of the tube 45 to be biased to approximately —35 volts. The decreased voltage at the plate of the conducting tube B1 is transferred through the lead 66 and capacitor 67 to the control grid of the conductive tube A1 to initiate the switching of the trigger A to the Off condition. When the trigger A switches Off, the decreased voltage at the plate of the tube A2 biases the control grid of the tube 37 to approximately —85 volts and thereby renders it non-responsive to pulses from the shaping circuit.

The next plus pulse from the shaping circuit renders the tube 45 conductive and a negative pulse is transferred through the lead 51 to the plate of the tube C1 to switch the trigger C On. When the trigger C switches On, a decreased voltage is transferred through the lead 68 and capacitor 69 to the control grid of the conductive tube B1 to switch the trigger B Off. This switching of the trigger B biases the control grid of the tube 45 to approximately —85 volts, thereby rendering the commutator non-responsive to subsequent pulses from the shaping circuit.

The terminals 80 and 81 connected respectively to the plate of the tube C2 and the control grid of the tube C1 may be connected to circuits to form a complete ring type commutator.

On the other hand, the terminal 80 may be connected to any device responsive to the voltage at that terminal and the terminal 81 connected to a source of negative pulses to switch the trigger C Off, thus resetting the commutator to its preselected starting condition.

Hence, the commutator may be used as a single cycle device after being primed. For such use, an opening and closing of the cancel bias switch CBS may be necessary after each single cycle of operation to return the commutator to the starting condition.

Figure 3:
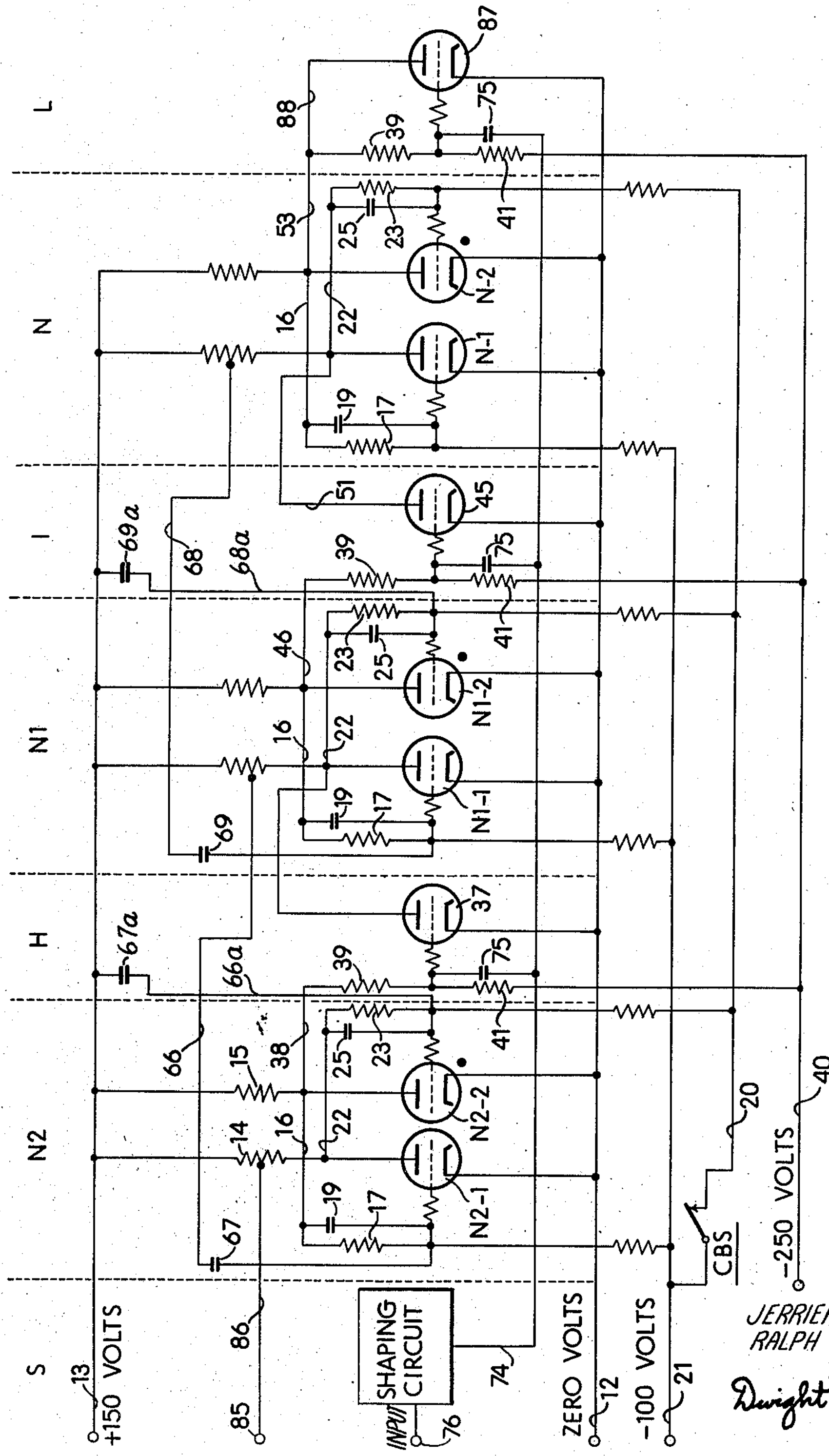
Fig. 3 is a circuit diagram showing one embodiment of novel commutator having an automatic reset.

Referring to Fig. 3, the shaping circuit S and the interstage coupling circuits H and I are each identical with the corresponding circuit of Fig. 2.

The trigger circuits N2, N1 and N are the last three triggers of a commutator having N number of triggers and are identical with the triggers A, B and C, respectively, of Fig. 2. The triggers and interstage coupling circuits are connected as in Fig. 2.

The terminal 85 connected through the lead 86 to the plate resistor 14 of the tube N2—1 is also connected to the control grid of a tube of the next prior trigger, not shown, to switch the latter trigger Off when the trigger N2 switches On. The novel switching circuit L is provided to return the commutator to the preselected starting position at the end of each cycle of commutator operation. The cathode of tube 87 is connected directly to the zero volt line 12 and its plate is connected directly to the plate of the tube N—2 through leads 88 and 53. The control grid of the tube 87 is connected to the plate of the tube N2 through the lead 53 and resistor 39 and to the —250 volt line 40 through a resistor 41.

When the commutator is in the preselected starting condition, the coupling tubes 37 and 45 and the switching tube 87 are biased to approximately —85 volts, and positive pulses applied to the lead 74 by the shaping circuit do not affect the stable condition of any of the trigger circuits. However, when the trigger N2 is switched from Off to On, as the result of normal counter operation, the negative bias on the control grid of the tube 37 is increased in the plus direction to approximately —35 volts to render the tube 37 responsive to a pulse from the lead 74.

When the next positive pulse is applied to the control grid of the tube 37, it is rendered conductive and causes the trigger N1 to switch from Off to On. When the trigger N1 switches On, the bias on the control grid of the tube 45 is increased to approximately —35 volts as a result of the increased voltage at the plate of the tube N1—2. At the same time, the decreased voltage at the plate of the tube N1—1 causes a negative pulse to be transferred through the lead 66 and capacitor 67 to the control grid of the tube N2—1 to switch the trigger N2 from On to Off. When the trigger N2 switches Off, the control grid of the tube 37 is biased to approximately —85 volts and thereby rendered non-responsive to positive pulses from the lead 74.

When the shaping circuit applies the next positive pulse to the lead 74, the tube 45 is rendered conductive and causes the trigger N to switch from Off to On. When the trigger N switches On, a negative pulse is transferred through the lead 68 and capacitor 69 to the control grid of the conductor tube N1—1 to switch the trigger N1 from On to Off. When the trigger N1 switches Off, the bias on the control grid of the tube 45 is decreased to approximately —85 volts, thereby rendering it non-responsive to positive pulses from the line 74. Also, when the trigger N was switched On, the increased voltage at the plate of the non-conducting tube N—2 causes the control grid of the tube 87 to be biased to approximately —35 volts.

The next positive pulse applied to the control grid of the tube 87 renders it conductive. The decreased voltage at the plate of the tube 87 is transferred through the leads 88 and 53 to the plate of tube N2 to switch the trigger N from On to Off. When the trigger N switches Off, the decreased voltage at the plate of the conductive tube N—2 causes the control grid of the tube 87 to be biased to approximately —85 volts, thereby rendering it non-responsive to subsequent positive pulses from the lead 74 and returning the commutator to the preselected starting condition with the triggers N2, N1 and N in the Off condition and the tubes 37, 45 and 87 non-responsive to the positive pulses from the lead 74.

Briefly, the high voltage at the plate of the tube N—2 resulting from the switching On of the trigger N renders the switching tube 87 responsive to positive pulses from the lead 74. When the tube 87 is rendered conductive in response to a positive pulse from the lead 74, it effects a switching of the trigger N back to the Off condition. The slight time delay in the pulse transfer caused by the capacitor 75 and resistor 39, connected between the control grid of the tube 87 and the plate of the tube N—2, is sufficient to insure that the trigger N will switch Off in response to the conduction of the tube 87 before the decreased voltage at the plate of the tube N—2 renders the tube 87 non-conductive.

Because of the novel automatic resetting effected by the switching circuit L, the commutator of Fig. 3 is repeatedly operable. The novel switching circuit L may be connected to the trigger C of Fig. 2 in the exact manner that it is connected to the trigger N of Fig. 3. In such case the terminals 80 and 81 and the lead 70 of Fig. 2 are dispensed with. When the switching circuit L is so used, the trigger C is reset automatically to the Off condition to return the commutator to the initial preselected starting condition. This provides a commutator for single cycle operation with an automatic reset at the end of each cycle, each cycle of operation being initiated from an external source at a preselected time.

While there have been shown and described and pointed out the fundamental novel features of the invention as applied to several modifications, it will be understood that various omissions and substitutions and changes in the form and details of the circuits illustrated and in their operation may be made by those skilled in the art without departing from the spirit of the invention. It is the intention, therefore, to be limited only as indicated by the scope of the following claims.

What is claimed is:

1. An electronic commutator comprising a series of electronic trigger circuits each having an On and an Off condition of stability, alternately assumed; a coupling circuit connected between successive triggers, each coupling circuit comprising a grid controlled triode having its grid connected to one trigger and its plate connected to another trigger; a source of plus pulses; means for applying said pulses simultaneously to the grids of the triodes of the coupling circuits, and means for altering the On or Off condition of one trigger to thus alter the bias on the grid of one coupling triode whereby the plus pulses applied to all the grids will render only the altered bias triode responsive.

2. In an electronic commutator including a series of trigger circuits each having two grid controlled tubes and On and Off conditions of stability alternately assumed; cancel bias means for simultaneously placing said triggers in a preselected one of said conditions; a coupling circuit for each trigger including a grid controlled triode, connected between successive triggers and to a source of pulses; a resistive connection from the grid of each triode to the plate of one tube of the next lower trigger for priming the grid in accordance with the condition of stability of the trigger; a connection from the plate of each triode to the plate of one tube of the next higher trigger for switching this trigger from one condition of stability to the other when the triode responds to an applied pulse and a connection from the plate circuit of one tube of said higher trigger to the control grid of one tube of said lower trigger for effecting a switching of the latter trigger from one condition of stability to the other when the former trigger is switched from one condition of stability to the other.

3. A ring type electronic commutator including a series of trigger circuits each having two grid controlled tubes and two conditions of stability alternately assumed; cancel bias means for placing said commutator in a preselected starting position; a triode connected between successive triggers and to a source of pulses, said triode being primed by a switching of the next lower trigger so that when the conductive condition of the triode is changed by an applied pulse the change causes a voltage to be transferred to the next higher trigger to effect a switching thereof a connection from the plate circuit of one tube of each trigger to the control grid of one tube of the next lower trigger to effect a switching of the latter to one condition of stability when the former is switched to the other condition of stability.

4. A ring type commutator comprising a series of trigger circuits each having two grid controlled tubes and On and Off conditions of stability alternately assumed; cancel bias means for placing one of the triggers in the On condition and the remaining triggers in the Off condition; a triode for each trigger having its control grid resistively connected to the second tube of a lower trigger and its plate connected directly to the first tube of the next higher trigger; a capacitive connection from the control grid of the first tube of each trigger to the plate circuit of the first tube of the next higher trigger and a pulse source for applying simultaneously positive pulses to the grids of the triodes, said triodes between the triggers being primed when the next lower trigger is On and thus rendered conductive by pulses applied thereto for initiating the switching of the next higher trigger to the On condition, the next higher trigger thereby causing the next lower trigger to be switched Off.

5. A ring type commutator including a series of trigger circuits each having two tubes and two conditions of stability alternately assumed; cancel bias means for placing all triggers in the same preselected condition of stability at starting; a source of pulses; a grid controlled triode connected between successive trigger circuits the grid of each triode being primed in one stable condition only of its associated trigger to render it operative to step said commutator when an actuating pulse is added to its primed condition; a connection to each of said grids for applying actuating pulses from said source simultaneously to said grids and a connection for conveying a voltage change to one trigger to change the stable condition thereof to prime the grid of the triode connected thereto to render the commutator responsive to said applied pulses.

6. An electronic commutator including a series of trigger circuits each having two tubes and two conditions of stability alternately assumed; cancel bias means for placing all triggers in the same preselected condition of stability at starting; a source of pulses; a grid controlled triode connected between successive trigger circuits except the last and first the grid of each triode being primed in one stable condition only of its associated trigger to render it operative to step said commutator along when an actuated pulse is added to said primed condition; a connection from said source to each of said grids for applying the pulses simultaneously thereto and a connection for conveying a voltage change to one trigger to change the stable condition thereof to prime the grid of the triode connected thereto to render the commutator responsive to applied pulses.

7. A single cycle electronic commutator including a series of trigger circuits each having two tubes and two conditions of stability alternately assumed; cancel bias means for placing all triggers in the same preselected condition of stability at starting; a source of pulses; a grid controlled tube connected between successive trigger circuits except the last and first and primed in one condition of stability of said triggers but unprimed in the other; a connection from said source to each of said grid controlled tubes for applying pulses simultaneously to the tubes for operating a primed tube only; a connection for conveying a voltage change to one trigger to change the stable condition thereof to prime its connected tube to render the commutator responsive to applied pulses and a tube circuit connected to the last trigger and operative by the flipping of said trigger for applying a pulse to said trigger to switch it back to the preselected condition of stability at the end of each cycle of commutator operation.

8. A single cycle commutator comprising a series of trigger circuits each having two electronic tubes and On and Off conditions of stability alternately assumed; cancel bias means for initially placing all triggers in the Off condition; a grid controlled tube having its control grid resistively connected to the second tube of each trigger, except the last, and its plate connected directly to the first tube of the next higher trigger in the series; a capacitive connection from the control grid of the first tube of each trigger, except the last, to the plate circuit of the first tube of the next higher trigger in the series; a source of pulses; means for applying said pulses to the grid of the grid controlled tubes, said grid controlled tubes being rendered responsive to the said pulses when the next lower trigger is On, and when rendered conductive by said pulses initiating the switching of the next higher trigger to the On condition, the next higher trigger thereby causing the next lower trigger to be switched Off; a capacitive connection to the second tube of the first trigger in the series for transferring a negative pulse thereto to effect a switching of the trigger to the On condition and a tube circuit connection to the last trigger in the series and operative by the flipping On of said trigger for transferring a negative pulse thereto to effect a switching of the trigger to the Off condition at the end of each cycle of commutator operation.

9. A commutator comprising a series of trigger circuits each having two electronic tubes and On and Off conditions of stability alternately assumed; cancel bias means for initially placing all triggers in the Off condition; a grid controlled tube having its control grid resistively connected to the second tube of each trigger, except the last, and its plate connected directly to the first tube of the next higher trigger in the series; a capacitive connection from the control grid of the first tube of each trigger, except the last, to the plate circuit of the first tube of the next higher trigger in the series; a source of pulses; means applying said pulses to the control grids of the grid controlled tubes, said grid controlled tubes being rendered responsive to said pulses when the next lower trigger is On and when rendered conductive by said pulses initiating the switching of the next higher trigger to the On condition, the next higher trigger thereby causing the next lower trigger to be switched Off; a capacitive connection to the second tube of the first trigger in the series for transferring a negative pulse thereto to effect a switching of the trigger to the On condition and a grid controlled tube having its plate connected directly to the plate of the second tube of the last trigger in the series and its control grid resistively connected thereto and to said source of pulses so that the tube is rendered responsive to said pulses when the last trigger is switched On and when rendered conductive by said pulses effects a switching of the last trigger to the Off condition.

10. An electronic commutator continuously responsive to pulses including a chain of trigger circuits each having two tubes and two conditions of stability, alternately assumed; cancel bias means for placing the counter in a preselected starting position; a grid controlled tube connected between successive trigger circuits in said chain; means for applying pulses to said grid controlled tubes, said grid controlled tubes being connected to the plate of one tube of the next lower trigger circuit and conditioned by said trigger to be responsive to the applied pulses and connected to the plate of the next higher trigger to effect a switching of the stable condition thereof when the tube responds to said pulses; a connection from each trigger to the next lower trigger to effect a switching of the latter to one condition of stability when the former switches to the other condition of stability; a switching circuit connected to the last trigger circuit and to the source of pulses and actuated thereby to effect a switching of the last trigger to its preselected condition of stability at starting.

11. The commutator set forth in claim 10, wherein the switching circuit includes a grid controlled tube having its plate and control grid connected to the plate of one tube of the last trigger and its control grid connected to the source of pulses so that a change in the condition of stability of said last trigger renders the tube responsive to said pulses and the subsequent receipt thereof by the tube effects a switching of the last trigger.

12. The commutator set forth in claim 11 wherein the cancel bias means places each trigger in the same condition of stability to render the commutator non-responsive to the pulses and a connection is made to one trigger to convey a pulse thereto to change its stable condition and thereby condition its associated grid controlled tube to render the commutator responsive to the pulses.

13. In a circuit including a trigger having two tubes with the plate of each connected to a grid of the other and two conditions of stability alternately assumed, a switching circuit including a grid controlled tube having its control grid resistively connected to the plate of one tube of the trigger and its plate connected directly to the plate of the same tube of the trigger for switching the trigger to one condition of stability, said switching circuit being rendered responsive to voltage pulses by the increased voltage transferred to the control grid of the tube from one tube of the trigger when the trigger is switched to the other condition of stability.

14. The commutator of claim 9 including a capacitor connected between the control grid of the second tube of each trigger and the plate supply voltage of said tubes for transferring changes in the plate supply voltage to the second tube of each trigger.

JERRIER A. HADDAD.
RALPH L. PALMER.

REFERENCES CITED

The following references are of record in the file of this patent:

UNITED STATES PATENTS

| Number | Name | Date |
| --- | --- | --- |
| 2,306,386 | Hollywood | Dec. 29, 1942 |
| 2,324,314 | Michel | July 13, 1943 |
| 2,366,357 | Schlesinger | Jan. 2, 1945 |
| 2,384,379 | Ingram | Sept. 4, 1945 |
| 2,402,989 | Dickinson | July 2, 1946 |
| 2,403,918 | Grosdoff | July 16, 1946 |
| 2,409,689 | Morton et al. | Oct. 22, 1946 |
| 2,426,454 | Johnson | Aug. 26, 1947 |